US006596215B2

United States Patent
Mayumi et al.

(10) Patent No.: US 6,596,215 B2
(45) Date of Patent: Jul. 22, 2003

(54) METHOD OF MANUFACTURING A STEPPING MOTOR

(75) Inventors: Eiji Mayumi, Nagano (JP); Yasuhiro Ota, Nagano (JP); Kazuyo Okajima, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/955,953

(22) Filed: Sep. 20, 2001

(65) Prior Publication Data

US 2002/0036433 A1 Mar. 28, 2002

(30) Foreign Application Priority Data

Sep. 20, 2000 (JP) ........................................ 2000-285365

(51) Int. Cl.[7] ................. B29C 45/14; B29C 70/70; B29C 70/84
(52) U.S. Cl. ............... 264/263; 264/272.15; 264/272.2
(58) Field of Search .................. 264/263, 275, 264/272.15, 272.19, 272.2, 278; 29/596; 310/42, 43

(56) References Cited

U.S. PATENT DOCUMENTS

| | | | | |
|---|---|---|---|---|
| 4,841,190 A | * | 6/1989 | Matsushita et al. ......... 310/257 |
| 5,043,613 A | * | 8/1991 | Kurata et al. ................. 310/42 |
| 5,121,017 A | * | 6/1992 | Yamamoto et al. ........... 29/596 |
| 5,239,742 A | * | 8/1993 | Kobayashi et al. ...... 264/272.2 |
| 5,500,994 A | * | 3/1996 | Itaya ....................... 264/272.2 |
| 5,806,169 A | * | 9/1998 | Trago et al. ............. 264/272.2 |
| 6,031,304 A | * | 2/2000 | Suzuki et al. ............... 310/157 |
| 6,201,324 B1 | * | 3/2001 | Suzuki et al. ................. 29/596 |
| 6,323,569 B1 | * | 11/2001 | Akama ..................... 310/49 R |

FOREIGN PATENT DOCUMENTS

JP          6-165467          6/1994

* cited by examiner

Primary Examiner—Angela Ortiz
(74) Attorney, Agent, or Firm—Sughrue Mion, PLLC

(57) ABSTRACT

A stepping motor having a rotor consisting of a permanent magnet magnetized such that N poles and S poles are alternately arranged in the hoop direction, stator cores with pole teeth oppositely disposed on the outer peripheral surface of the rotor, and a coil bobbin integrally containing the stator cores as the result of resin molding and being used for supporting a coil wound thereon. In the stepping motor, holes are formed in the coil bobbin, and the holes range from an outer wall of the coil bobbin to the outer peripheral surfaces of the pole teeth. In the stage of resin molding, the dies are brought into contact with the pole teeth by the utilization of the holes, thereby preventing the pole teeth from being declined in the radial direction, and securing a satisfactory rigidity of the coil bobbin.

5 Claims, 3 Drawing Sheets

METHOD OF MANUFACTURING A STEPPING MOTOR

CROSS REFERENCE TO RELATED APPLICATION

The present invention is based on Japanese Patent Application No. 2000-285365, which is incorporated herein by reference.

BACKGROUND OF THE INVENTION

1. Field of the Invention

The present invention relates to a stepping motor having a structure which is free from the declination of the pole teeth of the stator cores, and a method of manufacturing the same.

2. Description of Related Art

Various types of stepping motors have been proposed. In each of those, a rotor consists of a permanent magnet magnetized such that N poles and S poles are alternately arranged in the hoop direction. Stators are disposed on the outer peripheral surface of the rotor. Each stator contains a coil bobbin, which integrally contains the stator cores as the result of resin molding and is used for supporting a coil wound thereon. The stepping motor thus constructed suffers from such a problem that when the stator cores are made integral with the coil bobbin by resin molding, the pole teeth are declined outside by a resin molding pressure. When the pole teeth are declined outside, a gap between the pole teeth and the rotor is excessively large, and the increase of the gap greatly affects the motor characteristics. To avoid this problem, the molding pressure is carefully adjusted so that the pole teeth are not declined outside. This forms one of the major factors to increase the cost to manufacture.

A stepping motor disclosed in JP-A-6-165467 includes means to prevent the pole teeth from being declined outside. The stepping motor is of the 2-phase type. Specifically, as shown FIG. 5, two core sets each consisting of two stator cores 41a and 41b (41c and 41d) are superimposed in a 2-phase fashion. In each core set, only the spaces among the pole teeth are filled with synthetic resin 81 by one piece molding. The synthetic resin 81 is prohibited from flowing into the outside of the pole teeth. In the structure, the molding pressure of the synthetic resin 81 does not affect the pole teeth in the radial direction, so that the pole teeth are not declined outside. In the stepping motor thus constructed, a coil (not shown) covered with an insulating film is directly wound on the outer peripheral surfaces of the pole teeth.

In the stepping motor disclosed in JP-A-6-165467, as described above, the stator cores 41a, 41b, 41c and 41d of the core sets are joined together by merely filling the spaces among the pole teeth with the synthetic resin 81. Consequently, a holding force for integrally holding the stator cores 41a, 41b, 41c and 41d, viz., a rigidity of the coil bobbin after molded, is weak. Further, the coil is wound in a state that it is in direct contact with the outer peripheral surfaces of the pole teeth. This creates an insulating problem of the coil insulated, specifically, the coil is covered with an insulating film. In winding the coil, the insulating film of the coil can be broken. As a result, there is a fear that the conductive wire (copper wire) of the coil is exposed outside at the part of the coil where the insulating film is broken. Contact of the conductive part or wire of the coil with the pole teeth results in short-circuiting. To apply insulating films to the pole teeth is one of solutions to this problem. This solution, however, involves other problems of increasing the number of manufacturing steps and the cost to manufacture.

SUMMARY OF THE INVENTION

Accordingly, an object of the present invention is to provide a stepping motor which prevents the pole teeth from being declined in the radial direction, secures a rigidity of the coil bobbin integrally including the stator cores, and solving the short-circuiting problem and others.

To achieve the above object, there is provided a stepping motor having a rotor consisting of a permanent magnet magnetized such that N poles and S poles are alternately arranged in the hoop direction, stator cores with pole teeth oppositely disposed on the outer peripheral surface of the rotor, and a coil bobbin integrally containing the stator cores as the result of resin molding and being used for supporting a coil wound thereon. The stepping motor is improved such that holes are formed in the coil bobbin, and the holes range from an outer wall of the coil bobbin to the outer peripheral surfaces of the pole teeth.

With provision of holes each ranging from an outer wall of the coil bobbin to the outer peripheral surfaces of the pole teeth, it is possible to prevent the pole teeth from declination in the radial direction in the stage of a resin molding, and to secure a rigidity of the coil bobbin in a certain level. In the resin molding, the molding die is provided with protrusions to be located within the holes, and the tops of the protrusions of the die are brought into contact with the outer peripheral surfaces of the pole teeth, and in this state, the resin injection is performed. As a result, the pole teeth are prevented from being declined outside. The coil bobbin includes the holes continuous to the pole teeth. However, provision of those holes do not lead to reduction of a rigidity of the coil bobbin. Additionally, the coil does not directly contact with the outer peripheral surfaces of the pole teeth, but is wound around the outer peripheral surface of the coil bobbin. Even if the insulating film of the coil is broken, there is no fear that the insulating film of the coil is broken, and its conductive part exposed comes in contact with the pole teeth.

In another aspect of the stepping motor constructed according to the invention, the width of each the hole as viewed in the hoop direction is narrower than the width of each the pole tooth at a position corresponding to each the hole. The rigidity of the coil bobbin is further increased. Further, there is no fear that the coil wound on the coil bobbin is loosened, and comes in contact with the pole teeth located at the inner part of the holes.

In yet another aspect of the stepping motor of the invention, a plurality of the holes are provided, and an inner side wall as viewed in the hoop direction of each the hole is perpendicular to a predetermined imaginary line including the center of the stepping motor. Accordingly, the die used for resin molding the coil bobbin of the stepping motor may be constructed such that it is vertically parted into two parts along the predetermined imaginary plane. Therefore, the die is simplified in construction, and the cost to manufacture is reduced.

In still another aspect of the stepping motor, the outside diameter of the stepping motor is 20 mmφ or less. Usually, of the stepping motors having the outside diameter of 50 mmφ or smaller, called small motors, those motors of 20 mmφ in outside diameter are thin in its stator core, and hence the pole teeth are easy to be declined by the molding pressure during the molding process. Further, the space used for coil winding is small, and the number of coil turns is small, when comparing with those in the small stepping motor. The declination of the pole teeth less affects the motor characteristics. The invention is free from such a problem since there is no case that the pole teeth are declined.

According to another aspect of the present invention, there is provided a method of manufacturing a stepping motor having a rotor consisting of a permanent magnet magnetized such that N poles and S poles are alternately arranged in the hoop direction, stator cores with pole teeth oppositely disposed on the outer peripheral surface of the rotor, and a coil bobbin integrally containing the stator cores as the result of resin molding and being used for supporting a coil wound thereon. In the manufacturing method, a cylindrical core member is disposed on the inner peripheral surfaces of the pole teeth. At least two outside dies each having protrusions protruded toward the core member are disposed on the outer peripheral surfaces of the pole teeth. The protrusions are brought into contact with the outer peripheral surfaces of the pole teeth, thereby preventing the pole teeth from declination, and in this state, cavities present between the core member and the outside dies are filled with resin, whereby the resin is made integral with the stator cores to form the coil bobbin.

The radially outward declination of the pole teeth by the molding pressure is prevented in a manner that the resin injection is carried out while the protrusions of the outside die are brought into contact with the outer peripheral surfaces of the pole teeth of the stator cores. In the coil bobbin thus molded, after the die having the protrusions is die cut, the holes ranging from the outer wall to the outer peripheral surfaces of the pole teeth are formed. However, formation of those holes does not lead to reduction of a rigidity of the coil bobbin. Additionally, the coil is wound on the outer peripheral surface of the coil bobbin made of resin, viz., it is not in direct contact with the outer peripheral surfaces of the pole teeth. With this, even if an insulating film on the coil surface is broken, there is no fear that the exposed metal part comes in contact with the pole teeth, resulting in short-circuiting.

In another method of manufacturing the stepping motor, each protrusion is narrower than the width of the same at a position where the protrusion comes in contact with the pole tooth. Accordingly, the width of the hole formed by each protrusion as viewed in the hoop direction is narrow, so that the coil bobbin rigidity integrally including the stator cores by resin molding is further increased. Further, there is no fear that the coil wound on the coil bobbin is loosened, and comes in contact with the pole teeth located at the inner part of the holes.

DETAILED DESCRIPTION OF THE PREFERRED EMBODIMENTS

Figure 1:
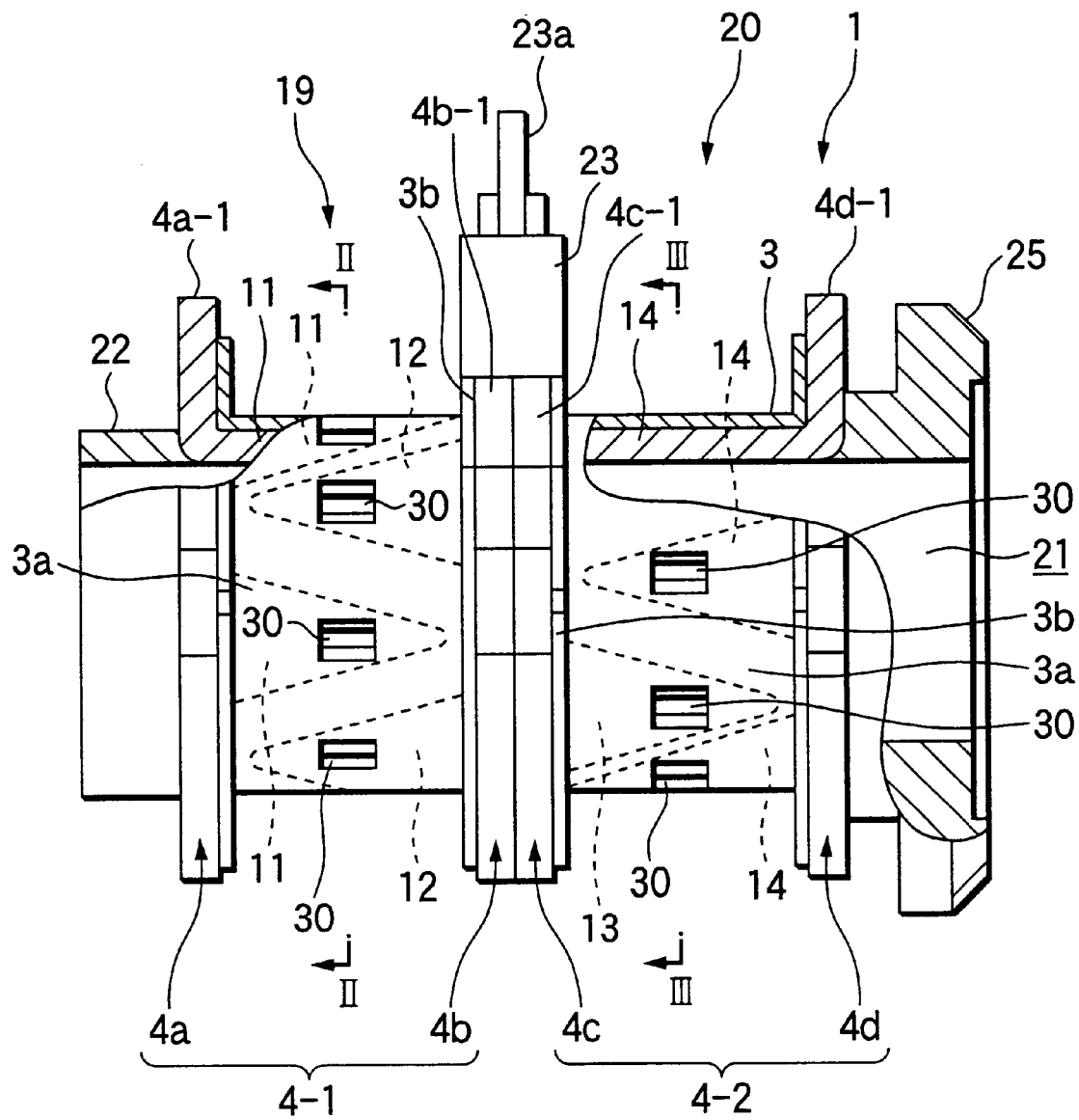
FIG. 1 is a plan view showing an overall structure of a stator in a stepping motor which is an embodiment of the present invention, a part of the structure being illustrated in cross section.
Figure 2:
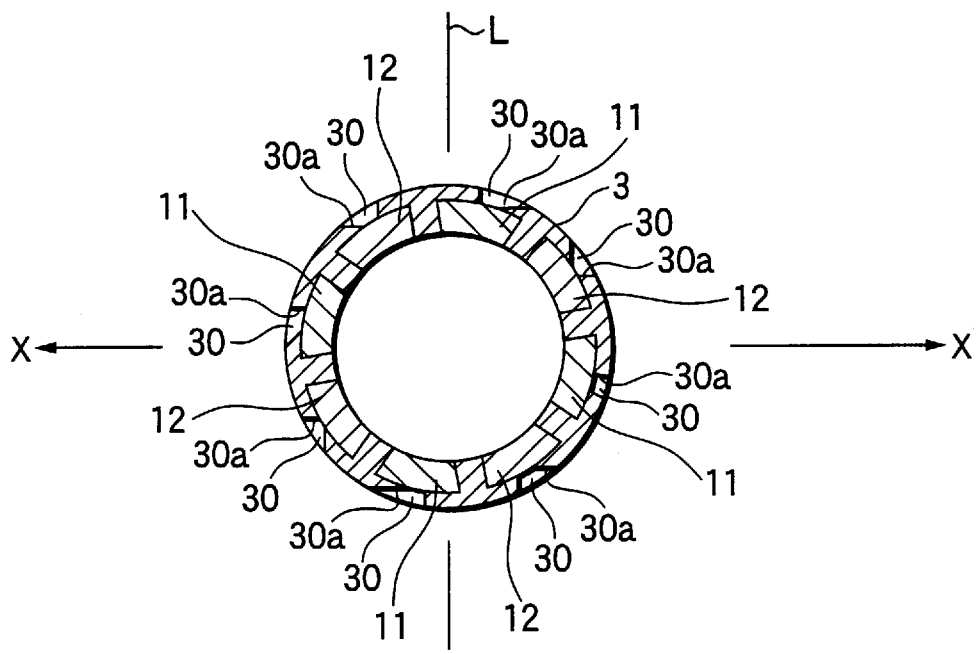
FIG. 2 is a sectional view taken on line II—II in FIG. 1.
Figure 3:
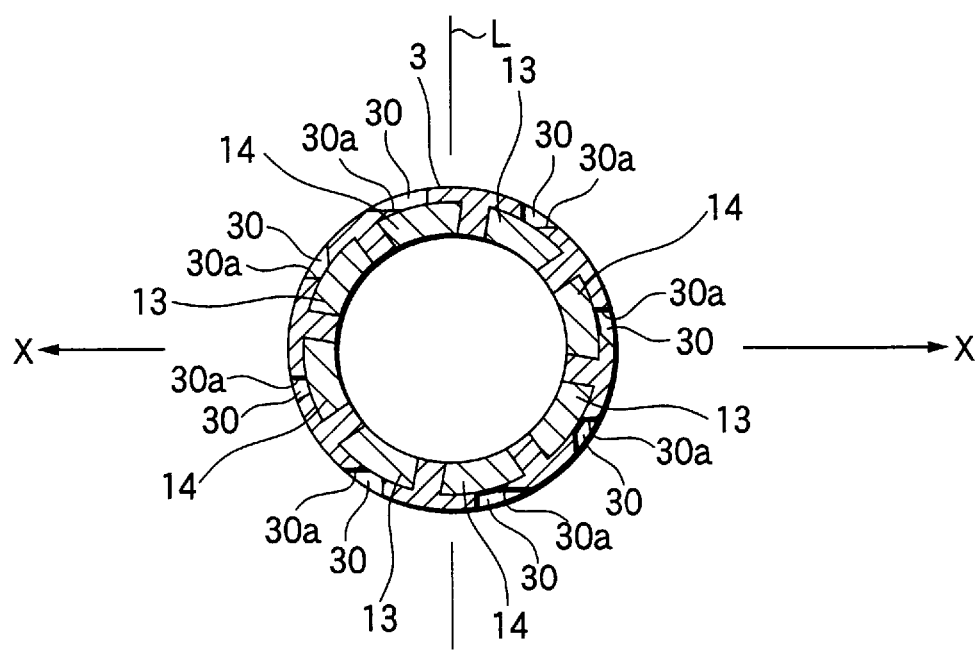
FIG. 3 is a sectional view taken on line III—III in FIG. 1.
Figure 4:
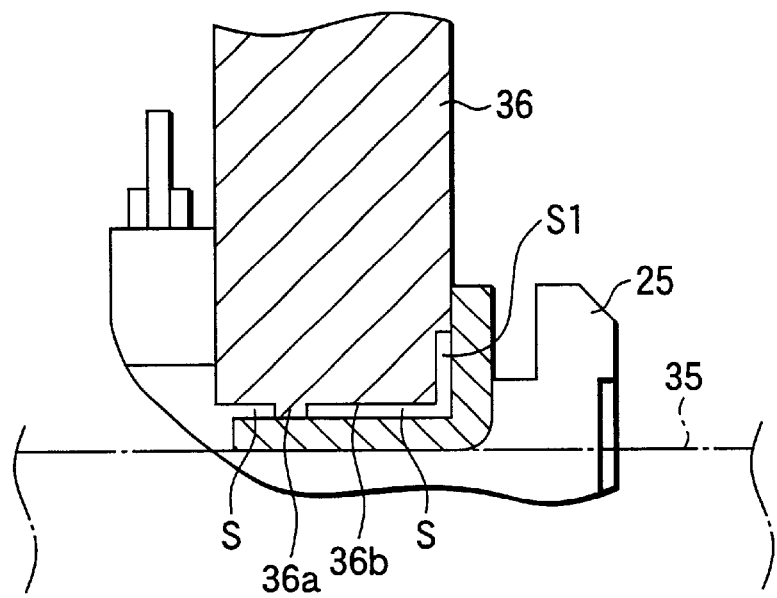
FIG. 4 is a sectional view showing a process of manufacturing the stepping motor of the embodiment, the illustration showing a state that a die is located on the outer peripheral surface of the pole tooth.
Figure 5:
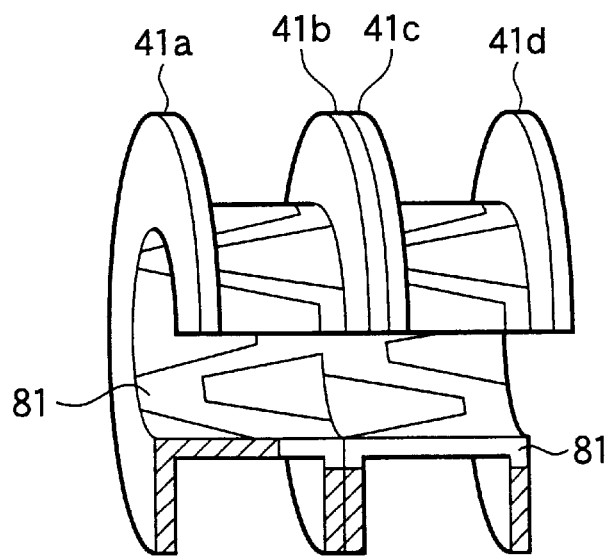
FIG. 5 is a perspective view, partly cut out, showing an external appearance of a stator, which is a key portion of a conventional stepping motor.

A stepping motor and a method of manufacturing the same, which are embodiments of the present invention, will be described with reference to the accompanying drawings. FIG. 1 is a plan view showing an overall stepping motor which is an embodiment of the present invention, a part of the structure being illustrated in cross section. FIG. 2 is a sectional view taken on line II—II in FIG. 1. FIG. 3 is a sectional view taken on line III—III in FIG. 1. FIG. 4 is a sectional view showing a process of manufacturing the stepping motor of the embodiment, the illustration showing, in a model form, a state that a die is located on the outer peripheral surface of the pole tooth.

As shown in FIG. 1, the stepping motor, which forms the embodiment of the invention, has a rotor (not shown) consisting of a permanent magnet magnetized such that N poles and S poles are alternately arranged in the hoop direction, and stators 1 oppositely disposed on the outer peripheral surface of the rotor. The stepping motor of the embodiment is of the called miniature type in which the outside diameter thereof is 20 mm$\phi$ (except the protruded part of the end of the motor).

The stator 1, which is of the 2-phase type, includes a core set 4-1 consisting of two stator cores 4a and 4b having respectively pole teeth 11 and 12, which face to each other in an interlacing fashion on the outer peripheral surface of the rotor, and a core set 4-2 consisting of two stator cores 4c and 4d having respectively pole teeth 13 and 14, which face to each other in an interlacing fashion on the outer peripheral surface of the rotor. Those core sets 4-1 4-2 are axially coupled in a 2-phase fashion. Those four stator cores 4a, 4b, 4c and 4d are insert molded, integrally with a coil bobbin 3 made of resin.

The stator core 4a is formed as follows. A central part of a magnet metal member, shaped like a disc, is cut so as to form four teeth, and those teeth are raised to form pole teeth 11 circumferentially arranged. The toots of the pole teeth 11 define the inner most circumference of flange 4a-1. The remaining stator cores 4b, 4c and 4d are likewise formed. In the core set 4-1, the stator cores 4a and 4b are disposed such that the circumferentially arrayed pole teeth 11 of the former interlace with the circumferentially arrayed pole teeth 12 of the later. Also in the core set 4-2, the stator cores 4c and 4d are disposed such that the circumferentially arrayed pole teeth 13 of the former interlace with the circumferentially arrayed pole teeth 14 of the later.

The coil bobbin 3 is formed such that resin covers the outer peripheral surface of the pole teeth 11 and 12 of the core set 4-1, which are alternately arranged in the hoop direction, and the pole teeth 13 and 14 of the core set 4-2, which are also arranged in the hoop direction, and the resin fills the cavities among the teeth, and is hardened. A rotor hole 21 is formed in the inner peripheral surface of the bobbin, while surrounding a rotor 2. The pole teeth 11, 12, 13 and 14 are exposed to the inner peripheral surface of the rotor hole 21.

The resin also flows to the opposite surfaces of the flanges 4a-1 and 4b-1 of the core sets 4-1 and 4-2 (as viewed in the axial direction), and the opposite surfaces of the flanges 4c-1 and 4d-1. As the result of the resin flowing, two spaces each shaped like U in cross section are superimposed in the axial direction. Those U-shaped spaces serve as winding spaces 19 and 20 within which coil (not shown) is wound.

A coil is wound on an outer peripheral surface of an outer wall 3a located within each of the spaces 19 and 20. Thus, in the invention, the coil is put on the outer wall 3a of the coil bobbin 3 made of resin. Therefore, even if an insulating film on the coil surface is broken and the metal part of the coil is exposed, there is no fear that the exposed metal part comes in contact with the pole teeth, resulting in short-circuiting. The winding start end and the winding terminating end of the coil in each winding space 19 (20) are connected to four terminal pins 23a (one terminal pin is illustrated in FIG. 1) raised at a terminal part 23. A plurality of holes 30 are formed in the coil bobbin 3. Those holes range from the outer wall 3a to the outer peripheral surfaces of the pole teeth 11, 12, 13 and 14.

A cylindrical portion 22 is extended to the left side in FIG. 1 from the edge of the hole 21 of the coil bobbin 3, and fit into a frame (not shown) A coupling portion 3b, which couples together the flanges 4b-1 and 4c-1 of the adjacent stator cores 4b and 4c, is provided at a middle position of the coil bobbin 3 in the axial direction and a position between the spaces 19 and 20. The terminal part 23, which has the four terminal pins 23a standing erect thereon, is formed integral with the coupling portion 3b in a state that the terminal part 23 is radially and outwardly protruded. A cap portion 25 is also formed integral with the coil bobbin 3, while being extended to the right in FIG. 1. The rotor hole 21 is cylindrical in shape while straightly extending from the cap portion 25 to the cylindrical portion 22.

The plurality of holes 30 formed in the outer wall 3a of the coil bobbin 3 will be described in detail.

Those holes 30 range from the outer wall 3a of the coil. bobbin 3 to the outer peripheral surfaces of the pole teeth 11, 12, 13 and 14. Those holes 30 are arranged at the middle portion of each winding spaces 19 (20) at a predetermined interval as viewed in the axial direction. The width of each hole 30 as viewed in the hoop direction is narrower than the width of each pole tooth 11(12, 13, 14) (as viewed in the hoop direction) at a position corresponding to each hole 30. Each hole is gradually reduced in width from the surface of the outer wall 3a toward the pole tooth 11(12, 13, 14). Therefore, even if winding of the coil becomes looser on the outer wall 3a, there is less possibility that the loosened part enters the hole 30 and comes in contact with the pole tooth. In the embodiment, the volume of the hole 30 is reduced by reducing the width of the hole 30, therefore the rigidity reduction of the coil bobbin due to the presence of the holes 30 is remarkably lessened and a certain level of its rigidity is secured. It is for this reason that the width of each hole 30 is reduced in the embodiment.

In the embodiment, each hole 30 has the thus figured width (as viewed in the hoop direction). It will be readily understood that the width configuration is not limited to it, however. For example, the width of the hole 30 may be selected to be larger than the width of the pole tooth 11 (12, 13, 14) at a position corresponding to the hole 30. In another example, the width of the hole at the inner part is narrower than the width of the pole tooth 11 (12, 13, 14) (as viewed in the hoop direction) at a position corresponding to the hole 30. And the width of the hole at the entrance (on the surface side of the outer wall 3a) is wider than the width of the pole tooth 11 (12, 13, 14) (as viewed in the hoop direction) at a position corresponding to the hole 30.

Those holes 30 are different from one another in cross section as shown in FIGS. 2 and 3. Specifically, an inner side wall 30a (as viewed in the hoop direction) of every hole 30 is perpendicular to a predetermined imaginary line L including the center of the stepping motor.

Description will be given hereunder about a characteristic process of a method of manufacturing the stepping motor thus constructed, more exactly, a method of forming the stator cores 4a, 4b, 4c and 4d integrally with the coil bobbin 3 by insert molding. FIG. 4 will be used for the description.

FIG. 4 shows only a key portion of the invention in a model form. In actually manufacturing the stepping motor, a part of an outside die 36 to be given later is located also outside the cap portion 25.

To start, the stator cores 4a, 4b, 4c and 4d are set to a given tool (not shown). A cylindrical core member 35 is brought to the inner peripheral surfaces of the pole teeth 11, 12, 13 and 14 of the stator cores 4a, 4b, 4c and 4d, and the outer peripheral surface of it is brought into contact with the inner peripheral surfaces of the pole teeth 11, 12, 13 and 14.

Then, the outside die 36 having a plurality of protrusions 36a protruded to the core member 35 is located on the outer peripheral surfaces of the pole teeth 11, 12, 13 and 14. The tops of the protrusions 36a are brought into contact with the outer peripheral surfaces of the pole teeth 11, 12, 13 and 14. Each protrusion 36a as viewed in the hoop direction is narrower than the width of the same at a position where it comes in contact with the pole tooth 11 (12, 13, 14). The reason why the protrusion width is so selected is that the hole 30 to be formed by each protrusion 36a is reduced in width in order to secure a certain level of rigidity and to prevent a loosened coil from entering there.

A cavity S is formed between the face 36b of the outside die 36, which faces the pole teeth 11, 12, 13 and 14 and the those pole teeth since the protrusions 36a are in contact with those pole teeth 11, 12, 13 and 14. A cavity (not shown) is also formed between the face 36b and the core member 35 in a portion of the outside die not having those pole teeth 11, 12, 13 and 14. A cavity S1 is further formed between the outside die 36 and the flanges 4a-1, 4b-1, 4c-1 and 4d-1. Those cavities are formed in a series.

In this stage of the manufacturing process, the stepping motor is put in a state that the injection of the resin to form the coil bobbin 3 is not carried out, and the stator cores 4a, 4b, 4c and 4d are located at predetermined positions of the completed stepping motor. In this state, the cavities S and S1 formed between the core member 35 and the outside die 36 are filled with resin. At this time, a resin molding pressure acts in such a direction as to press the pole teeth 11, 12, 13 and 14 in the radial direction.

As described above, the protrusions 36a of the outside die 36 are in contact with the outer peripheral surfaces of the pole teeth 11, 12, 13 and 14. Accordingly, if the resin molding force is relatively strong, the pole teeth 11, 12, 13 and 14 will never tumble. This is because the protrusions 36 serve as means for preventing the tumbling of the pole teeth. In the manufacturing method of the embodiment, a high level of strictness is not required in setting the resin molding pressure. This leads to reduction of the manufacturing cost.

After the filled resin is hardened, the outside die 36 is removed. The outside die 36 consists of two parts, which are parted along the imaginary plane L (FIGS. 2 and 3). In the die cutting following the resin injection, it is slid in the direction perpendicular to the imaginary plane L (see an arrow direction X in FIGS. 2 and 3). Through the die cutting, the coil bobbin 3 having the stator cores 4a, 4b, 4c and 4d incorporated thereinto is completed.

The resin also enters minute spaces among the adjacent pole teeth, in addition to the cavities S and S1. Accordingly, the pole teeth are made immovable with the resin filled. The resin also flows to and covers the circumferential surface consisting of an aggregation of the outer surfaces of the pole teeth, and is hardened. The outer peripheral surface of this part serves as the outer wall 3a of the coil bobbin 3. After the die cutting, those portions at which the protrusions 36a are located become holes 30 ranging from the outer wall 3a of the coil bobbin 3 to the outer peripheral surfaces of the pole teeth 11, 12, 13 and 14.

While the preferred embodiments of the invention have been described, it should be understood that the invention is not limited to the embodiment described, but may variously be modified, altered and changed within the scope of the invention. As recalled, in the embodiment, the inner wall 30*a* of each hole 30 is directed to be perpendicular to the imaginary plane L (see FIGS. 2 and 3), and the outside die 36 may be die cut by merely parting it in two directions. In this connection, if required, both the inner side walls of each hole 30 may be directed to be parallel to the centerline of the hole. In this case, the center line is directed toward the center of the stepping motor.

In this case, the number of dies used must be equal to that of the holes 30, and the outside die is die cut in radial directions. A disadvantage of the modification is that the cost to manufacture is higher than that by the embodiment in which only two directions are required for the die cutting. Advantages of the modification are to prevent the pole teeth 11, 12, 13 and 14 from declination and to secure the rigidity of a certain level or higher, as in the above-mentioned embodiment.

In the embodiment mentioned above, the stepping motor is a miniature motor 20 mm or shorter in outside diameter.

In the miniature motor which has a conventional construction and is manufactured by the conventional method, the pole teeth 11, 12, 13 and 14 are easy to bend under the resin molding pressure. In this connection, the invention effectively prevents the pole teeth from declination. Even in the motor of about 50 mmϕ, the declination of the pole teeth possibly occurs, although it is not serious. It is evident that the invention is applicable not only to the motor having the size mentioned above but also to the motor of relatively large size.

As seen from the foregoing description, holes are formed in a coil bobbin, and those holes range from an outer wall of the coil bobbin to the outer peripheral surfaces of the pole teeth. Provision of the holes produces the advantages of preventing the pole teeth from declination in the radial direction at the time of a resin molding, and of securing a rigidity of the coil bobbin in a certain level. Additionally, the coil is wound on the outer peripheral surface of the coil bobbin made of resin, viz., it is not in direct contact with the outer peripheral surfaces of the pole teeth. With this, even if an insulating film on the coil surface is broken, there is no fear that the exposed metal part comes in contact with the pole teeth, resulting in short-circuiting.

In a method of manufacturing a stepping motor, a cylindrical core member is disposed on the inner peripheral surfaces of the pole teeth. At least two outside dies each having protrusions protruded toward the core member are disposed on the outer peripheral surfaces of the pole teeth. The protrusions are brought into contact with the outer peripheral surfaces of the pole teeth, thereby preventing the pole teeth from declination. And in this state, cavities present between the core member and the outside dies are filled with resin, whereby the resin is made integral with the stator cores to form the coil bobbin.

Therefore, the protrusions of the outside die prevent the pole teeth from being declined in the radial direction even when a resin molding pressure acts in the resin molding stage. After the die cutting, holes are formed at the locations where the protrusions were present. Formation of those holes does not lead to reduction of a rigidity of the coil bobbin. Additionally, the coil does not directly contact with the outer peripheral surfaces of the pole teeth, but is wound around the outer peripheral surface of the coil bobbin. Even if the insulating film of the coil is broken, there is no fear that the insulating film of the coil is broken, and its conductive part exposed comes in contact with the pole teeth.

What is claimed is:

1. A method of manufacturing a stepping motor including a rotor consisting of a permanent magnet magnetized such that N poles and S poles are alternately arranged in the hoop direction thereof, a stator core with pole teeth oppositely disposed on the outer peripheral surface of said rotor, said pole teeth being bent so as to oppose the outer peripheral surface of said rotor, and a coil bobbin containing said stator core and supporting a coil wound thereon, said method comprising the steps of:

disposing a cylindrical core member on the inner peripheral surfaces of said pole teeth;

disposing at least two outside dies each having protrusions protruded toward said core member on outer peripheral surfaces of said pole teeth, thereby said protrusions being brought into contact with the outer peripheral surfaces of said pole teeth for preventing said pole teeth from declination;

forming a cavity between said core member and said outside dies; and injecting resin into said cavity while said protrusions formed on said outside dies contact the outer peripheral surfaces of said pole teeth, whereby said coil bobbin is molded integrally with said stator core and said pole teeth are preventing from declination.

2. A method of manufacturing a stepping motor according to claim 1, wherein each protrusion is narrower than the width of the same at a position where said protrusion comes in contact with said pole tooth.

3. A method of manufacturing a stepping motor according to claim 1, wherein the protrusions are formed so as to have a predetermined projecting height for forming the coil bobbin, and the coil bobbin is formed, except contact portions of the protrusions of the outside dies, by injecting resin so that the protrusions of the outside dies contact with the outer peripheral surfaces of the pole teeth and the core member contacts with the inner peripheral surfaces of the pole teeth.

4. A method of manufacturing a stepping motor according to claim 1, wherein the resin is injected while the protrusions contact the pole teeth.

5. A method of manufacturing a stepping motor according to claim 1, wherein two stator cores, in which the pole teeth project in the axial direction, are stacked so that the pole teeth are mated alternately, and the protrusions contact with the pole teeth in a substantially center position of each of the two stator cores in the axial direction thereof.

\* \* \* \* \*